(12) United States Patent
Ohmi et al.

(10) Patent No.: US 6,563,072 B1
(45) Date of Patent: May 13, 2003

(54) WELDING TECHNIQUE FOR FORMING PASSIVE CHROMIUM OXIDE FILM IN WELD AND GAS FEED SYSTEM FOR WELDING

(75) Inventors: Tadahiro Ohmi, 1-17-301, Komegabukuro 2-chome, Aoba-ku, Sendai-shi, Miyagi-ken 980-0813 (JP); Takahisa Nitta, Tokyo (JP); Yasuyuki Shirai, Miyagi-ken (JP); Osamu Nakamura, Miyagi-ken (JP)

(73) Assignees: Tadahiro Ohmi, Miyagi-ken (JP); Fujikin, Inc., Osaka (JP)

( * ) Notice: Subject to any disclaimer, the term of this patent is extended or adjusted under 35 U.S.C. 154(b) by 0 days.

(21) Appl. No.: 09/509,707
(22) PCT Filed: Oct. 3, 1998
(86) PCT No.: PCT/JP98/04493
§ 371 (c)(1), (2), (4) Date: Jun. 8, 2000
(87) PCT Pub. No.: WO99/34027
PCT Pub. Date: Jul. 8, 1999

(30) Foreign Application Priority Data

Oct. 3, 1997 (JP) .............................................. 9-271785

(51) Int. Cl.$^7$ .......................... B23K 35/38; B23K 9/16; B23K 9/167; B23K 9/173
(52) U.S. Cl. ......................................... 219/74; 219/72
(58) Field of Search ..................... 219/74, 72, 76.1, 219/76.12

(56) References Cited

FOREIGN PATENT DOCUMENTS

| EP | 727503 A1 | * | 8/1996 | ............ C22C/38/22 |
| JP | 05018423 | | 1/1993 | ............ F16D/23/06 |
| JP | 406210483 A | * | 8/1994 | ............ B23K/31/00 |
| JP | 407323374 A | * | 12/1995 | ............ B23K/9/23 |
| JP | 09078221 | | 3/1997 | ............. C23C/8/12 |
| JP | 09195031 | | 7/1997 | ............. C23C/8/14 |

* cited by examiner

*Primary Examiner*—M. Alexandra Elve
(74) *Attorney, Agent, or Firm*—Randall J. Knuth

(57) ABSTRACT

Welding of material such as a piping using ferrite system stainless steel, in which a back sealed gas used for conventional welding is switched from argon gas (or a hydrogen gas/argon gas mix) to an argon gas to which an oxidizing gas is doped at the time of forming a chromium oxide passivation film. Welding conditions are set at the temperature in which the inner surface of the piping does not melt at the time of forming the chromium oxide passivation film. The temperature of the welding piping is set uniformly between welding conditions in conventional welding and welding conditions at the time of forming the chromium oxide passivation film, and in order to replace gases used with conventional welding with gases used at the time of forming the chromium oxide passivation film. A cycle of one round or more is performed under the welding conditions for forming a chromium oxide passivation film, thereby, to form the chromium oxide passivation film on a weld in concurrence with welding.

16 Claims, 12 Drawing Sheets

WELDING TECHNIQUE FOR FORMING PASSIVE CHROMIUM OXIDE FILM IN WELD AND GAS FEED SYSTEM FOR WELDING

TECHNICAL FIELD OF THE INVENTION

This invention relates to a welding technology giving a chromium oxide passivation treatment at the time of welding and a gas supplying system used at the time of welding.

BACKGROUND OF THE INVENTION

Heretofore, the chromium oxide passivation treatment been performed on the weld under the condition that chromium is allowed to be diffused by micro-crystallizing a most-outside surface of a piping by means of complexly-electrolytic polishing the weld of austenite system stainless steel (SUS316L), or the chromium oxide passivation treatment been performed after welding had been performed using ferrite system stainless steel excellent in the diffusion of chromium and welding had been completed. Since the chromium oxide passivation treatment is performed after completion of welding in both cases, re-chromium oxide passivation treatment is required when welding of the gas-piping and members on which the chromium oxide passivation treatment has been given is performed, whereby much expense in time and effort have been taken.

Moreover, gases doped with oxygen used for giving the chromium oxide passivation treatment at the time of welding are fed to a point at which welding is performed after oxygen of 100% is correctly controlled by a gas panel on which a fluid control device is equipped, and so a total length of the piping reaches tens of meters. Besides, it has been very hard to use, since it is performed manually also in switching, therefore, problems of improper operations are caused. Moreover, even though a length in the piping to be welded reaches four meters, in addition the space required for welding is very wide, a fluid control device is installed on the panel or the like in an arc gas and back-sealed gas supplying systems of the prior art, whereby handling of a gas supplying has been hard.

The object of the invention makes the treatment possible in a short time and leads to improvement in productivity by giving the chromium oxide passivation treatment in concurrence with welding.

The object of the invention is to provide a gas supplying system capable of supplying oxygen, or moisture, and hydrogen correctly controlled for forming an oxidized passivity film on the weld.

The object of the invention is to solve the problems of the improper operations or the like due to manually switching.

SUMMARY OF THE INVENTION

This invention is a welding technology for forming chromium oxide a passive state on a weld, comprising:
switching gases to be flown into the cavity from an argon gas, or mixed gases of the argon gas and hydrogen gas to the argon gas which is doped with an oxidizing gas; as well as irradiating at least the weld with an extent of arc or an electron beam which does not melt the weld, after welding while flowing argon gas, or mixed gases of the argon gas and hydrogen gas as the back-sealed gas into a cavity of material to be welded which a chromium passivity film is formed on an inner surface of a cavity.

The invention is a gas supplying system supplying a back-sealed gas and an arc gas (gases flowing in a welding head) used at the time of welding wherein a gas flow rate and a gas concentration are correctly controlled by a fluid control device.

The invention is characterized in that a switching valve for the gases at the time of welding and at the time of the chromium oxide passivation treatment can be controlled by a timer, and all components constituting the gas system can be controlled by electric signals (it is preferable that all components used are constituted by metal, moreover, a chromium oxide passivation film is formed on a portion contacting with the gases).

DETAILED DESCRIPTION OF THE INVENTION

Explanation of Characters

Figure 1:
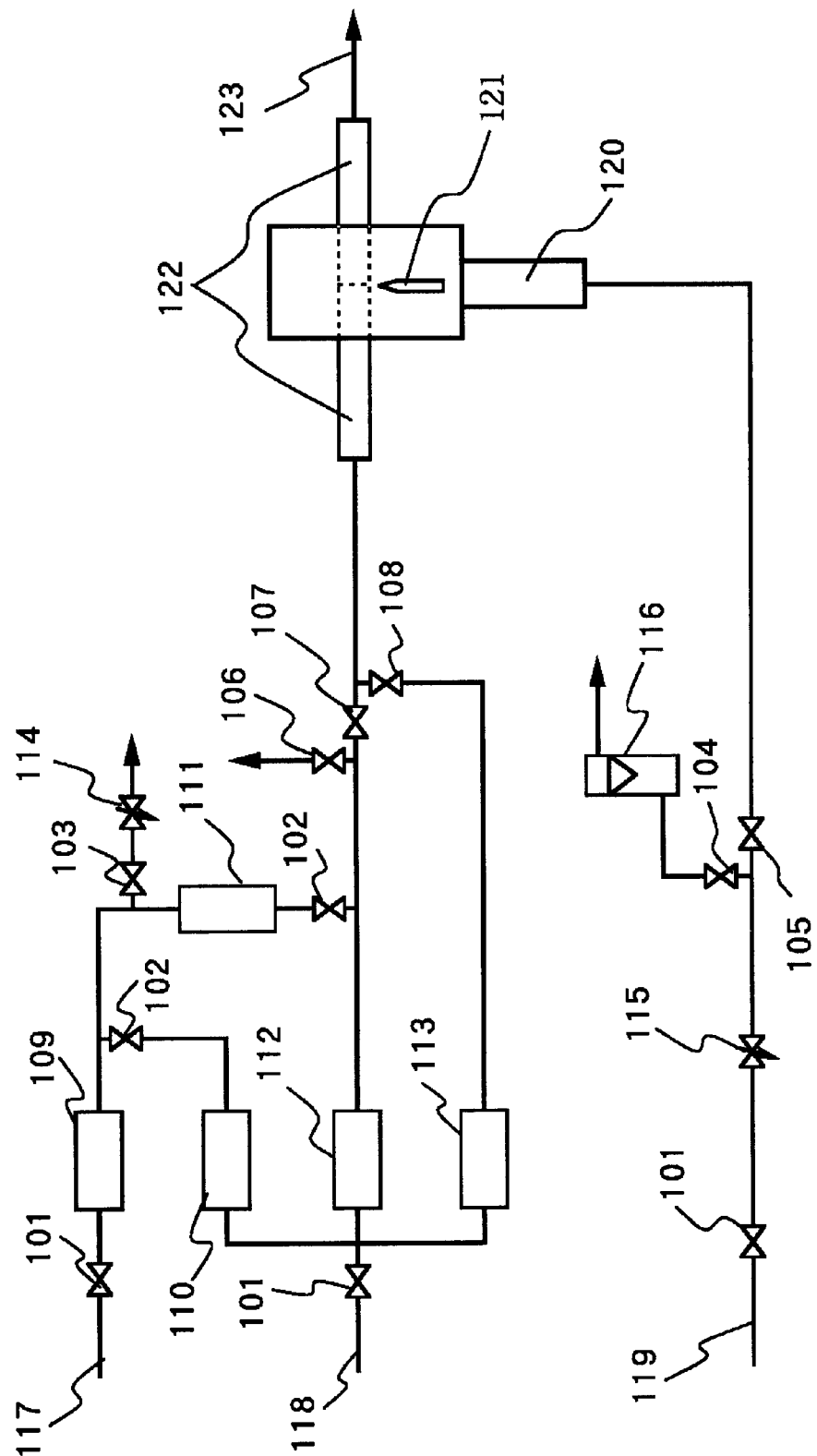
FIG. 1 is a schematic view of a gas supplying system in which gases doped with a very small quantity of oxidizing gas can be switched at the time of welding according to the invention.

101 valve A
102 valve B 103 valve C
104 valve D
105 valve E
106 switching valve A
107 switching valve B
108 switching valve C
109 flow controller A
110 flow controller B
111 flow controller C
112 flow controller D
113 flow controller E
114 flow adjusting valve A
115 flow adjusting valve B
116 flow meter
117 oxygen
118 argon gas
119 arc gas (10% hydrogen/argon gas)
120 welding head
121 welding electrodes
122 welding piping
123 back-sealed gas
1001 valve
1002 switching valve
1003 flow controller
1004 flow adjusting valve
1005 flow meter
1006 switching-valve actuating switch
1007 timer
1008 welding power-source
1009 gas box
1010 oxygen
1011 argon gas
1012 arc gas
1013 welding head
1014 welding electrodes
1015 welding piping
1016 back-sealed gas
1101 combination welding power-source and gas supplying system
1102 monitor for welding
1103 monitor for gas supplying
1104 arc gas (10% hydrogen/argon gas)
1105 oxygen
1106 argon gas
1107 back-sealed gas
1108 welding head
1109 welding electrodes
1110 welding piping
1201 welding power-source
1202 monitor for welding
1203 gas supplying system
1204 monitor for gas supplying
1205 arc gas (10% hydrogen/argon gas)
1206 oxygen
1207 argon gas
1208 back-sealed gas
1209 welding head
1210 welding electrodes
1211 welding piping Best Modes for Carrying out the Invention This invention is characterized in that the back-sealed gas used at the time of usual welding is switched from argon gas (or hydrogen gas/argon gas) to the argon gas with which the oxidizing gas is doped at the time of forming a chromium oxide passivation film to form the chromium oxide passivation film on the weld in piping welding.

It is characterized in that oxygen of 1 ppm to 1000 ppm, preferably 10 ppm to 100 ppm, more preferably 20 ppm to 50 ppm in oxygen concentration is doped as the oxidizing gas. Chromium cannot be oxidized when being not more than 1 ppm, moreover, iron also is oxidized together with chromium when being 1000 ppm or more. An oxygen concentration is controlled within the range of 1 ppm to 1000 ppm, thereby being able to form the chromium oxide passivation film containing no iron.

It also may be doped with moisture of 1 ppm to 1000 ppm, preferably 10 ppm to 100 ppm, more preferably 20 ppm to 50 ppm as the oxidizing gas.

An oxidizing doping gas also may be the oxygen-doped gases containing hydrogen of 0% to 10%. Since oxidation is progressed while the weld is reduced by doping with hydrogen, surface roughness of the weld becomes fine.

It is characterized in that welding conditions are set at the temperature which the inner surface of the piping does not melt at the time of forming the chromium oxide passivation film, and the rotation speed is set at 3 rpm to 15 rpm, preferably 6 rpm to 8 rpm, and a current is set at 3 A to 10 A, preferably 6 A to 8 A. Generation of arc becomes unstable, so that welding becomes hard, when setting the rotation speed at less than 3 rpm, a current at less than 3 A. Heat becomes hard to transfer to the inner surface of the piping, so that chromium can not be oxidized, when setting the rotation speed at 15 rpm or more. Moreover, the piping is molten, so that the chromium oxide passivation film can not be formed, when setting a current at 10 A or more.

Welding conditions for forming the chromium oxide passivation film are to allow to rotate the welding electrodes one round to four rounds, preferably three rounds.

The chromium oxide passivation film can not be formed in the case of not more than one round, and an oxidizing atmosphere becomes too strong in the case of 4 rounds or more, so that iron also is oxidized together with chromium.

Temperature of the welding piping is removed uniformly between welding conditions in usual welding and welding conditions at the time of forming the chromium oxide passivation film, and rotation of one round or more is performed under the welding conditions for forming the chromium oxide passivation film in order to replace the gases used at the time of usual welding with the gases used at the time of forming the chromium oxide passivation film.

The temperature of the welding piping can not be removed uniformly in the case of not more than one round, so that the chromium oxide passivation film is formed uniformly in the circumferential direction.

Ferrite system stainless steel containing chromium of 25% or more is used for piping material. When the chromium thereby contained is more than 25%, iron is oxidized together with chromium.

The gas supplying system for supplying the back-sealed gas and the arc gas used at the time of welding is a gas-applying system in which a gas flow rate and a gas concentration are controlled correctly by the fluid control device, and has a performance capable of switching the gases used at the time of welding to the gases used at the time of forming the chromium oxide passivation film. The gas-applying system is systematized, thereby being allowed to move at the time of welding. Moreover, switching of the gases can be interlocked with the welding power-source by connecting the welding power-source with the switching valve with the timer, whereby the improper operation of the valve at the time of welding can be eliminated at all.

The applying system is characterized in that all the members thereof are constituted by metal in all, and the chromium oxide passivation treatment preferably is given on the inner surface, whereby the moisture concentration in the gases used at the time of welding can be suppressed to the limit, so that oxidation except for chromium can be suppressed.

All components constituting the gas supply system can be controlled by electric signals, and computer control and a computer-controlled data management become possible, so that the artificial improper operation can not only be prevented, but also productivity such as the management of the welding conditions at the time of welding also can be improved.

The back-sealed gas doped with the oxidizing gas for forming the oxidized passivity film may be supplied from an already-diluted bomb and the reduced oxidizing gas concentration also can be controlled readily.

The treatment can be performed more readily and in a shorter time, and a cost also can be inexpensive as compared with the prior art by using the welding technology according to the invention. The chromium oxide passivity treatment can be given in the each portion contacting with the gases including also the weld by building up a fluid supplying system with the piping welded using the welding technology according to the invention, thereby being able to realize the fluid supplying system with an excellent drought characteristic, corrosion resistance and non-catalytic function.

Moreover, whatever has a cavity may be treated as the members to be welded in the invention, whereby for example, the piping and the valve or the like are given.

EMBODIMENTS

Hereinafter, the welding technology for forming the chromium oxide passivation film on a weld and the gas supplying system used at the time of welding according to the invention will be described with reference to the drawings, however, the invention is not limited thereto.

Welding in this embodiment was performed using the welding power-source (Model 1207A) made by Arc Machine, Inc. and the welding machine made by Excel Design Corp.

Embodiment 1

FIG. 1 is a schematic view of the gas supplying system in which the gases doped with a very small quantity of oxidizing gas can be switched at the time of welding according to the invention.

A valve A101 is a valve for supplying the respective gases.

Oxygen of 100% is correctly controlled by a fluid control device A109 (10 cc/min.), and dilution of a first stage is performed with the argon gas (990 cc/min.) controlled by a fluid control device B110.

At this point of time, the oxygen concentration becomes 1%. Subsequently, oxygen diluted at the first stage is controlled by a fluid control device C111 (18 cc/min.), and dilution of a second stage is performed with the argon gas controlled by a fluid control device D112 (5982 cc/min.). Therefore, the back-sealed gas which the oxygen concentration (30 ppm) is correctly controlled is obtained (6000 cc/min.).

At this point of time, when oxygen gas diluted at the first stage (1000 cc/min.) flows in the fluid control device C111, the oxygen gas diluted at the first stage except for the amount of the gases controlled by the fluid control device C111 is exhausted by a valve C103 as well as a flow adjusting valve A114, said oxygen gas being supplied into the fluid control device C111, in order to suppress an increase in a primary side pressure of the fluid control device C111.

Moreover, for the arc gas, after, a flow rate first is controlled by a flow adjusting valve B115 and a flow meter 116 under the condition of a valve D104 opened and a valve E105 closed, the arc gas is introduced into a welding head by switching to the condition of a valve D104 closed and a valve E105 opened.

The usual welding gases are the arc gas (the argon gas doped with hydrogen of 10%) and the back-sealed gas (the argon gas), and are supplied by switching to the condition of the switching valve B107 closed and a switching valve C106 opened. The concentration of the oxidizing gas was correctly controlled by flow controllers and the oxidizing gas was exhausted by switching to the condition of the switching valve B107 closed and the switching valve C106 opened at the time of welding, and the back-sealed gas could be switched from the argon gas used at the time of welding to the back-sealed gas including the oxidizing gas used at the time of the chromium oxide passivation treatment by switching to the condition of the switching valve A106 closed the switching valve B107 opened and a switching valve C108 closed.

Therefore, it has allowed to give the chromium oxide passivation treatment in concurrence with welding.

Embodiment 2

The oxygen-concentration dependence in forming the chromium oxide passivation film was studied with the ferrite system stainless steel on which the chromium oxide passivation film was formed approximately 300 Å under the oxidizing condition of 525° C., 100 ppm of moisture, hydrogen of 10% and 3 hours using the welding technology according to the invention.

Moreover, the chromium oxide passive state was formed under the condition of a current of 6 A, the rotation speed of 6 rpm, rotating the welding electrodes by three rounds, and a surface analysis at that time was performed by photoelectron spectroscopy with ESCA1000 made by Shimazu Sheisakusyo Corp., and a film thickness of the chromium oxide passivation film was measured.

Figure 2:
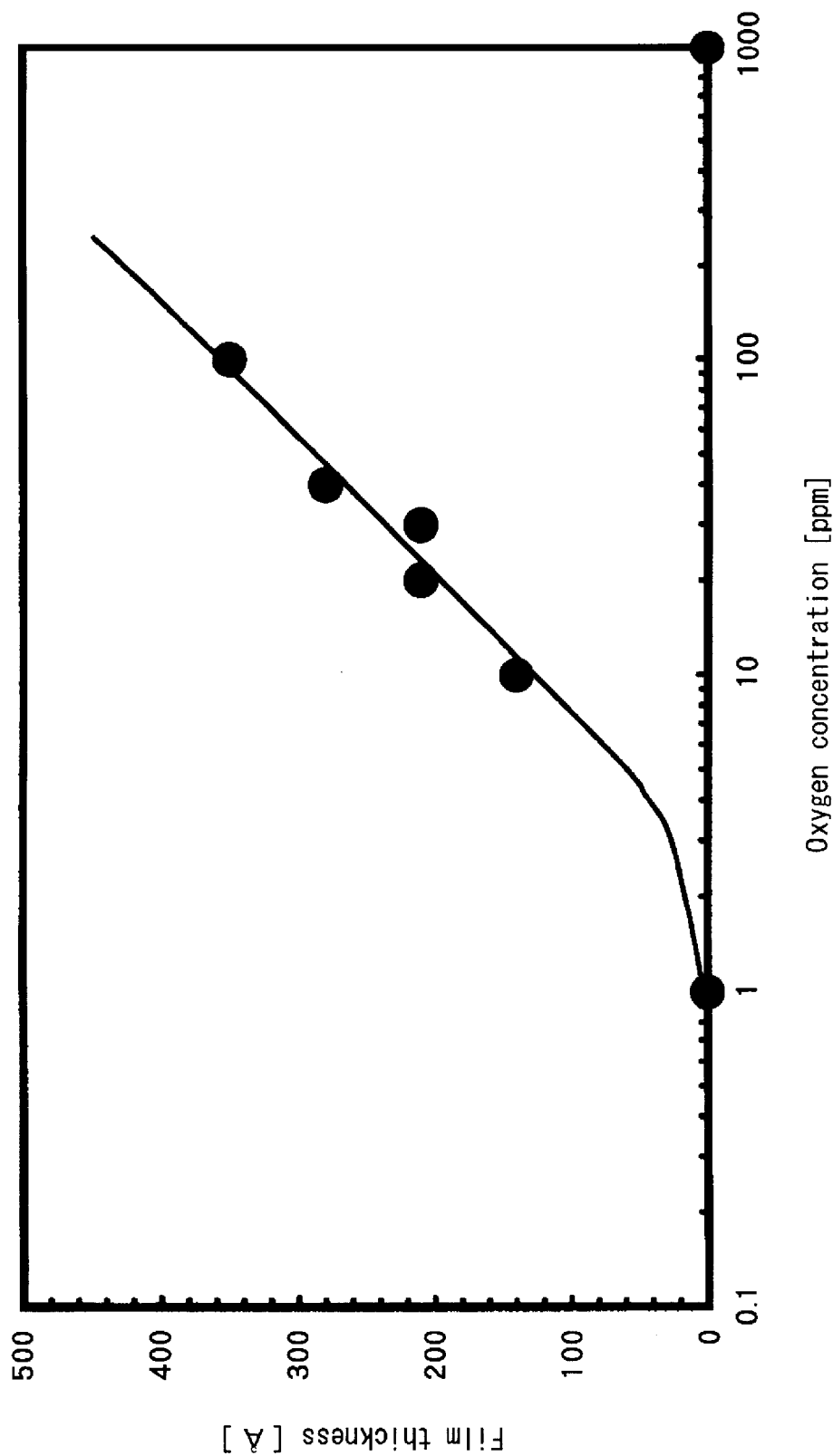
FIG. 2 is a graph of a result showing an oxygen-concentration dependence at the time of forming a chromium oxide passivation film according to a welding technology of the invention.

FIG. 2 is a graph showing the result of the oxygen-concentration dependence at that time.

It has been found from the results that the chromium oxide passivation film could be formed with the oxygen concentration of 1 ppm to 1000 ppm by the welding technology according to the invention. Moreover, a relationship of a film thickness versus a concentration from 10 ppm to 100 ppm was apparent, in addition, the chromium oxide passivation film of 200 Å to 300 Å could be obtained from 20 ppm to 50 ppm, and it has been found that the film thickness thereof was the same as the film thickness of the chromium oxide passivation film of base material and the extremely good quality chromium oxide passivation film has been formed.

Embodiment 3

The moisture-concentration dependence of the chromium oxide passivation film was studied with the ferrite system stainless steel on which the chromium oxide passivation treatment was given in the same manner as Embodiment 2.

The current, the rotation speed, the number of rotation of the welding electrodes are the same as Embodiment 2.

Figure 3:
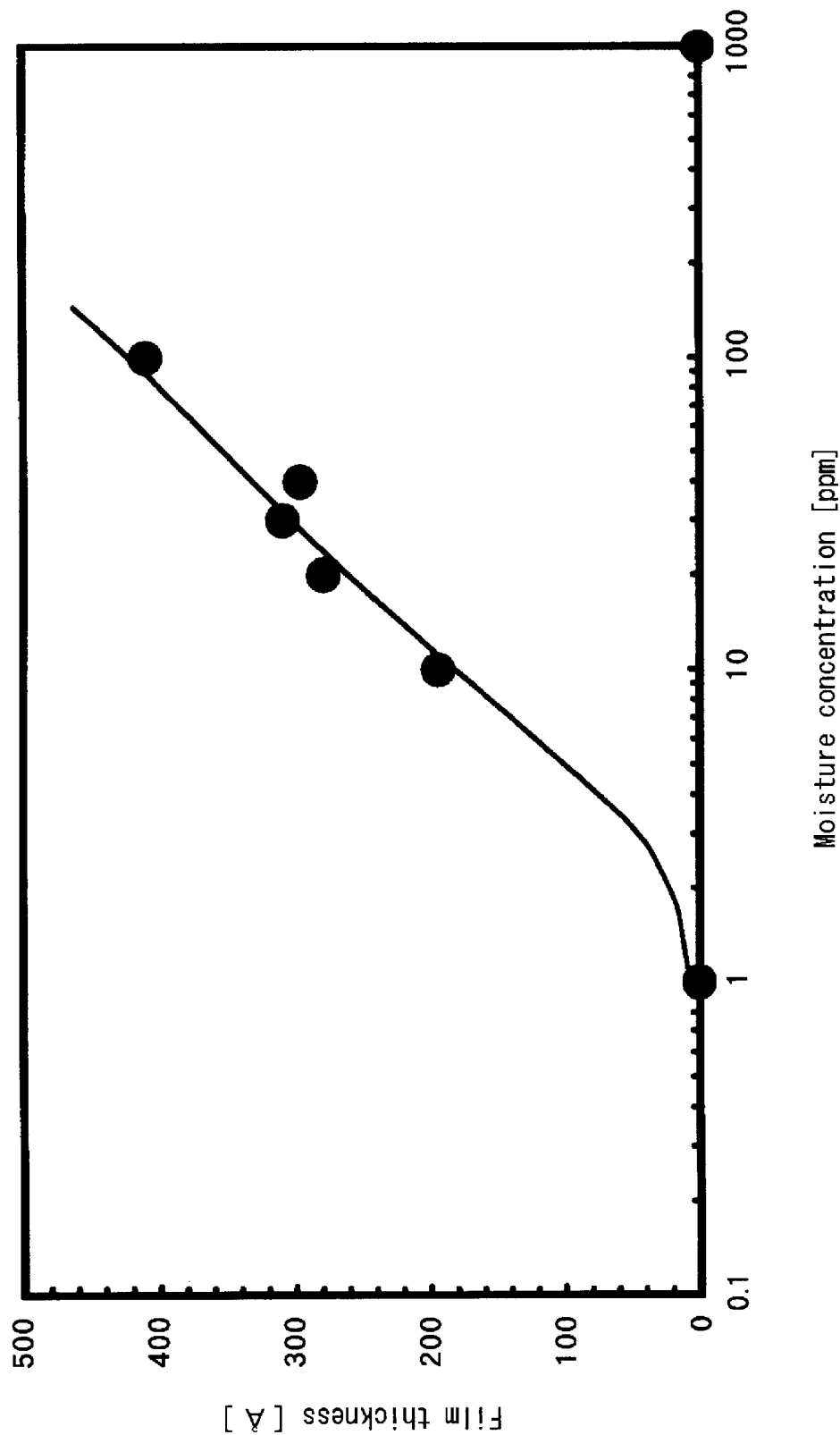
FIG. 3 is a graph of a result showing a moisture-concentration dependence at the time of forming a chromium oxide passivation film according to a welding technology of the invention.

FIG. 3 is a graph showing the result of the moisture-concentration dependence at that time.

It has been found from the results that the chromium oxide passivation film could be formed with the oxygen concentration of 1 ppm to 1000 ppm by the welding technology according to the invention as was the case doped with oxygen. Moreover, a relationship of a film thickness versus a concentration from 10 ppm to 100 ppm was apparent, in addition, the chromium oxide passivation film of 200 Å to 300 Å could be obtained from 20 ppm to 50 ppm, and it has been found that the film thickness thereof was the same as the film thickness of the chromium oxide passivation film of base material and the extremely good quality chromium oxide passivation film has been formed.

Embodiment 4

Hydrogen was doped in the gases doped with oxygen of 30 ppm, and the hydrogen-concentration dependence was studied under the same condition as Embodiment 2.

The current, the rotation speed, the number of rotation of the welding electrodes are the same as Embodiment 2.

Figure 4:
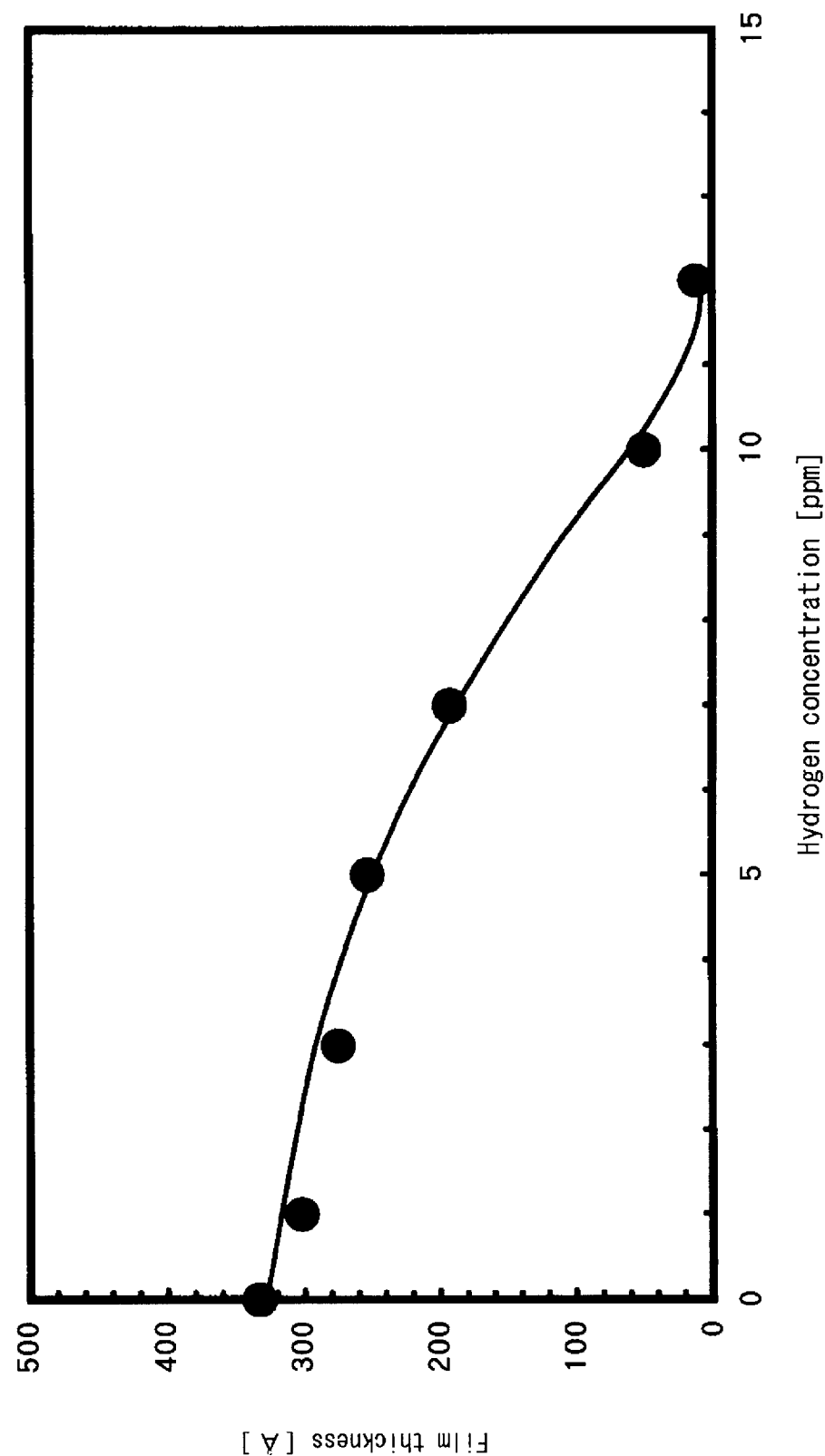
FIG. 4 is a graph of a result showing a hydrogen-concentration dependence at the time of forming a chromium oxide passivation film according to a welding technology of the invention.

FIG. 4 is a graph showing the result of the hydrogen-concentration dependence at that time.

It has been found from the results that the chromium oxide passivation film could be formed if being within the range of 10% even though being doped with hydrogen.

Since surface roughness becomes fine by doping with hydrogen, it is assumed that doping with hydrogen of within the range of 10% is preferable since the chromium oxide passivation film also is formed and surface roughness of the weld also becomes fine.

Embodiment 5

The welding-electrodes rotation speed dependence in forming the chromium oxide passivation film was studied with the ferrite system stainless steel on which the chromium oxide passivation treatment was given in the same manner as Embodiment 2. Moreover, the chromium oxide passive state was formed under the condition of an oxygen concentration of 30 ppm and a current of 6 A, rotating the welding electrodes by three rounds.

Figure 5:
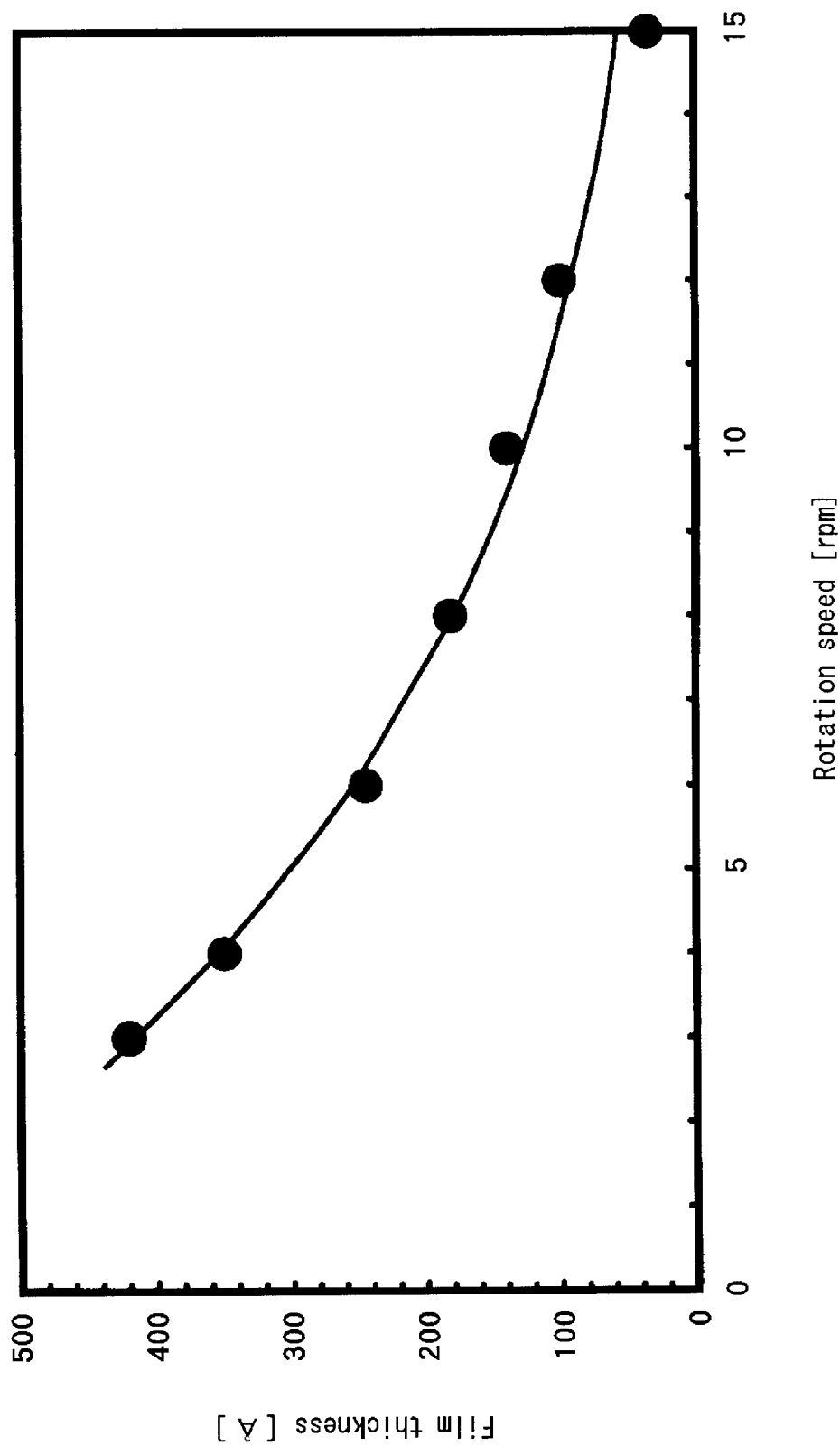
FIG. 5 is a graph of a result showing a rotation speed dependence of welding electrodes at the time of forming a chromium oxide passivation film in a welding technology of the invention.

FIG. 5 is a graph showing the result of the rotation speed dependence at that time.

From the results, arc of the welding machine becomes unstable, so that welding becomes hard when being less than 3 rpm, on the other hand, heat becomes hard to transfer to the inner surface of the piping when being 15 rpm or more, so that chromium can not be oxidized. Therefore, it has been found that the rotation speed of 3 rpm to 15 rpm was preferable in order to form the chromium oxide passivation film, in addition, the chromium oxide passivation film of 300 Å to 400 Å could be obtained from 6 rpm to 8 rpm, and the film thickness thereof was the same as the film thickness of the chromium oxide passivation film of base material and the extremely good quality chromium oxide passivation film has been formed.

Embodiment 6

The current-concentration dependence in forming the chromium oxide passivation film was studied with the ferrite system stainless steel on which the chromium oxide passivation treatment was given in the same manner as Embodiment 2.

Moreover, the chromium oxide passive state was formed under the condition of an oxygen concentration of 30 ppm and the rotation speed of 6 rpm, rotating the welding electrodes by three rounds.

Figure 6:
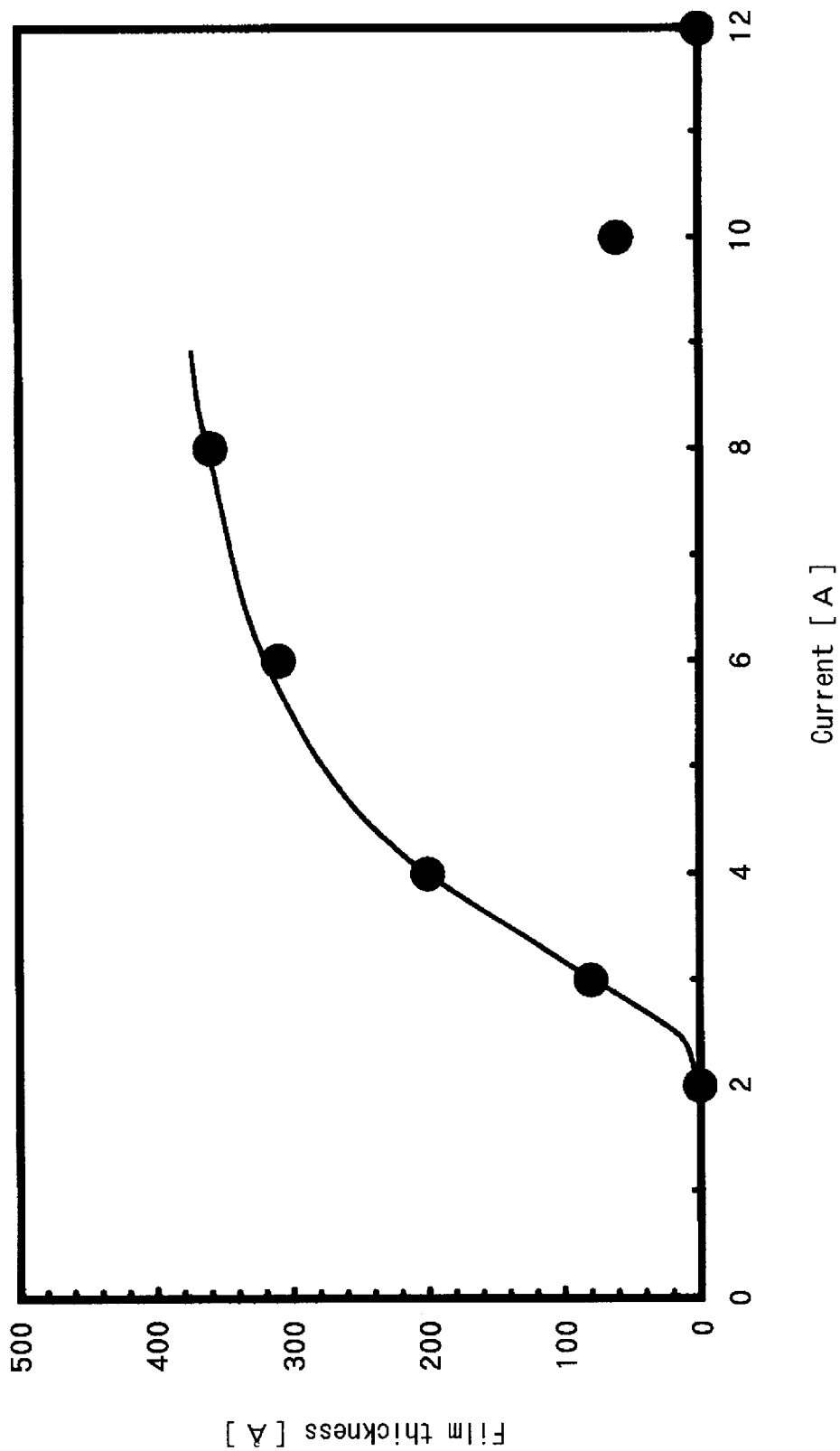
FIG. 6 is a graph of a result showing a current dependence at the time of forming a chromium oxide passivation film in a welding technology of the invention.

FIG. 6 is a graph showing the result of the current dependence at that time.

From the results, arc of the welding machine becomes unstable, so that welding becomes hard when being less than 3 A, on the other hand, the piping is molten when being 10 A or more, so that the chromium oxide passivation film can not be formed. Therefore, it has been found that the current of 3 A to 10 A was preferable in order to form the chromium oxide passivation film, in addition, the chromium oxide passivation film of 300 Å to 400 Å could be obtained from 6 A to 8 A, and the film thickness thereof was the same as the film thickness of the chromium oxide passivation film of base material and the extremely good quality chromium oxide passivation film has been formed.

Embodiment 7

The dependence on the number of rotation of welding electrodes in forming the chromium oxide passivation film was studied with the ferrite system stainless steel on which the chromium oxide passivation treatment was given in the same manner as Embodiment 2.

Moreover, the chromium oxide passive state was formed under the condition of an oxygen concentration of 30 ppm, the current of 6 A and the rotation speed of 6 rpm.

Figure 7:
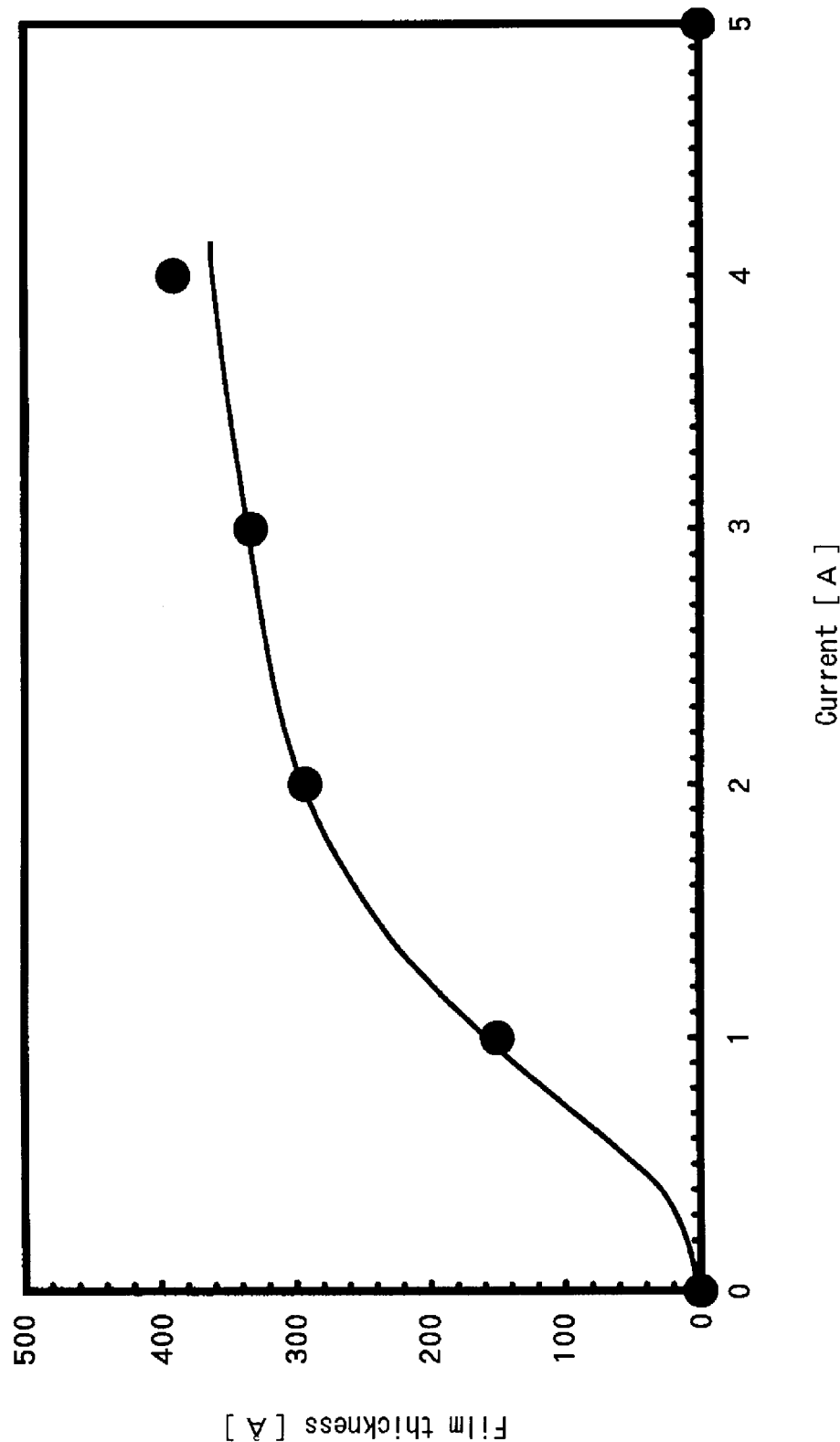
FIG. 7 is a graph of a result showing a dependence on a number of rotation of welding electrodes at the time of forming a chromium oxide passivation film in a welding technology of the invention.

FIG. 7 is a graph showing a result of the time dependence at that time.

From the results, the chromium oxide passivation film is not formed when being less than one round, on the other hand, the film thickness becomes too thick, whereby iron is detected, so that chromium can not be oxidized, when being treated by 5 rounds. Therefore, it is assumed that for the number of the rotation which the chromium oxide passivation film is formed, one round to four rounds is be optimal.

Embodiment 8

The chromium oxide passivation film was formed using the ferrite system stainless steel on which the chromium oxide passivation treatment was given in the same manner as Embodiment 2, setting temperature of the welding piping uniformly between welding conditions in usual welding and welding conditions at the time of forming the chromium oxide passivation film, and rotating the welding electrodes one round under the welding condition of forming the chromium oxide passivation film in order to replace the gas used at the time of usual welding with the gas used at the time of forming the chromium oxide passivation film, and the surface analysis of the circumferential direction was performed.

Moreover, the chromium oxide passive state was formed under the condition of an oxygen concentration of 30 ppm, the current of 6 A and the rotation speed of 6 rpm, rotating the welding electrodes by three rounds.

Figure 8:
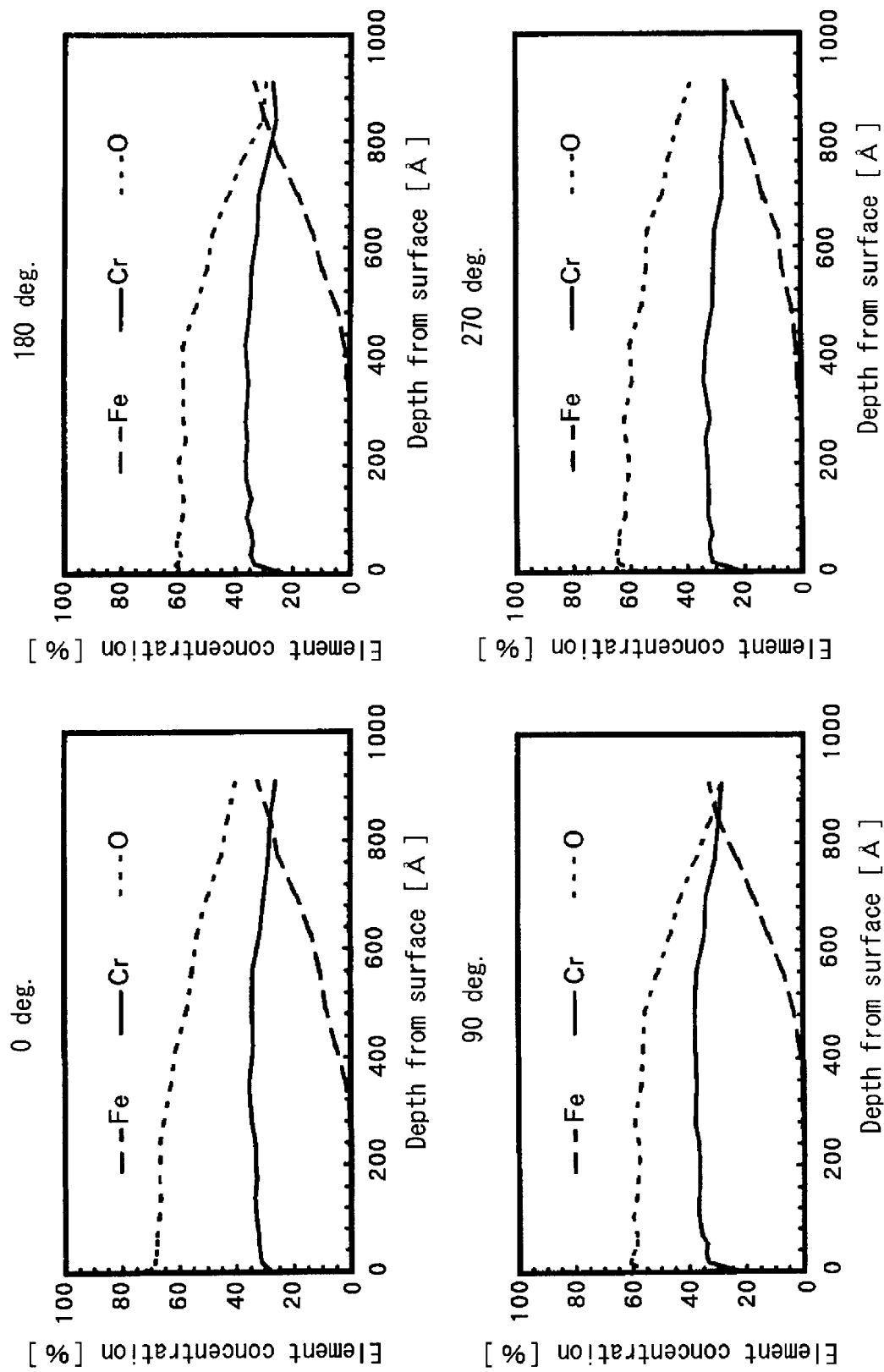
FIG. 8 is a graph of a result of a chromium oxide passivation film formed by a welding technology of the invention, said result being obtained by evaluating in a circumferential direction of a piping by photoelectron spectroscopy.

FIG. 8 is a graph showing a result of the surface analysis dependence at that time.

It has been found from the results that the chromium oxide passivation film of 300 Å to 400 Å can be formed uniformly in respective points at 0°, 90°, 180°, 270° of the circumferential direction of the piping. Therefore, it has been found to set temperature of the welding piping uniformly between welding conditions in usual welding and welding conditions at the time of forming the chromium oxide passivation film, and to rotate the welding electrodes one round under the welding condition of forming the chromium oxide passivation film in order to replace the gas used at the time of usual welding with the gas used at the time of forming the chromium oxide passivation film were effective for uniforming the film thickness of the chromium oxide passivation film of the weld.

Embodiment 9

The chromium-concentration dependence in forming the chromium oxide passivation film was studied with the ferrite system stainless steel containing chromium of 18%, 25%, 27%.

Moreover, the chromium oxide passivation treatment was formed under the condition of an oxygen concentration of 30 ppm, the current of 6 A and the rotation speed of 6 rpm, rotating the welding electrodes by three rounds.

Figure 9:
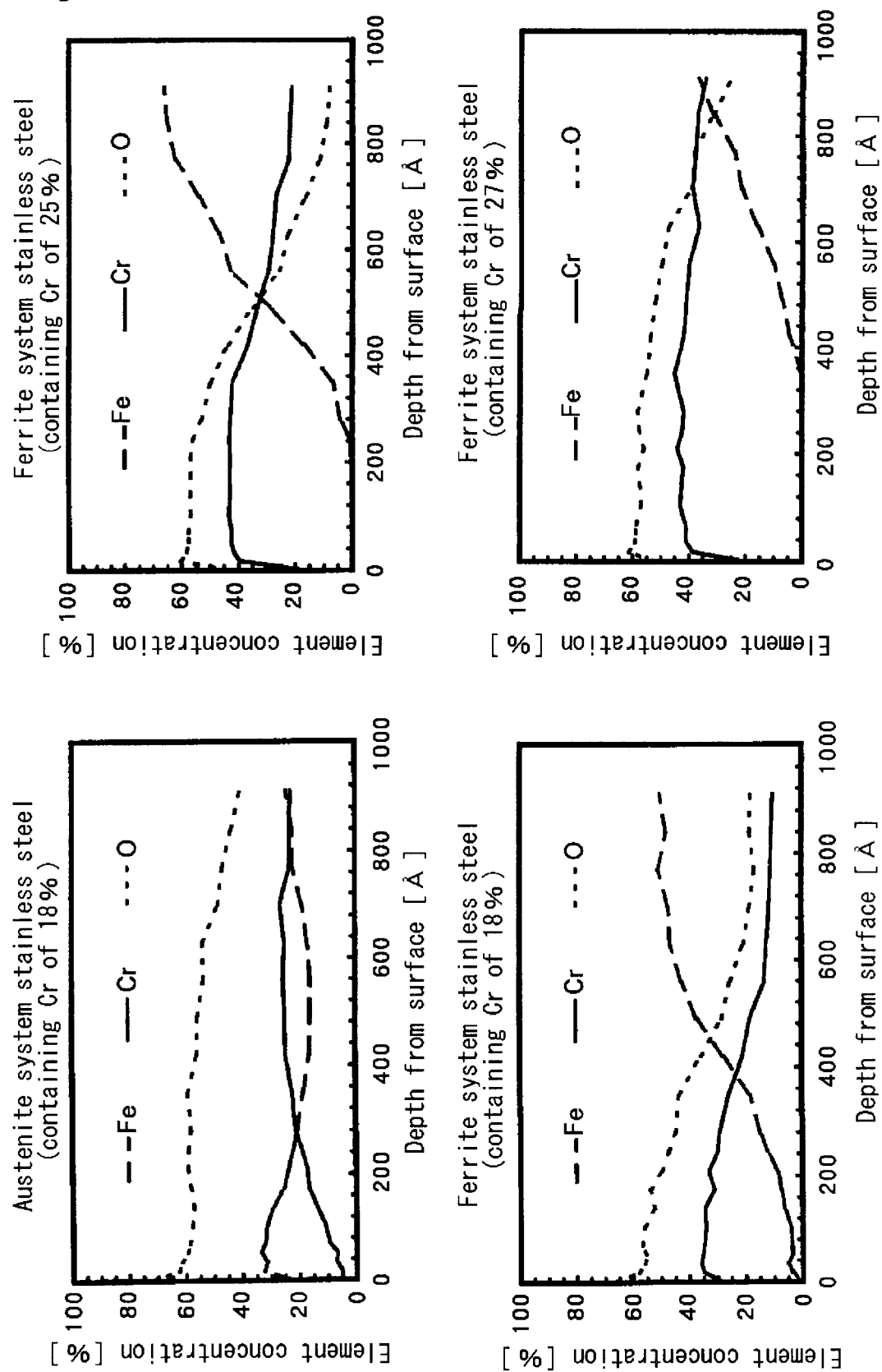
FIG. 9 is a graph of a result showing a chromium content dependence in piping material at the time of forming a chromium oxide passive state by a welding technology of the invention.

FIG. 9 is a graph of a result showing the chromium-concentration dependence at that time.

It has been found from the results that ferrite system stainless steel had tendency to form the chromium oxide passivation film readily as compared with austenite system stainless steel (SUS316L). This is based on differences between austenite system stainless steel having a face-centered cubic structure and ferrite system stainless steel having body-centered cubic structure, and oxidizing speed of chromium differs based on differences in a crystal lattice, whereby it is assumed that ferrite system stainless steel is optimal for forming the chromium oxide passivation film. Moreover, it has been found that the chromium oxide passivation film could not be formed, when chromium was not contained 25% or more in concentration. Therefore, it is assumed that 25% or more is optimal for the concentration of chromium contained in ferrite system stainless steel.

Figure 10:
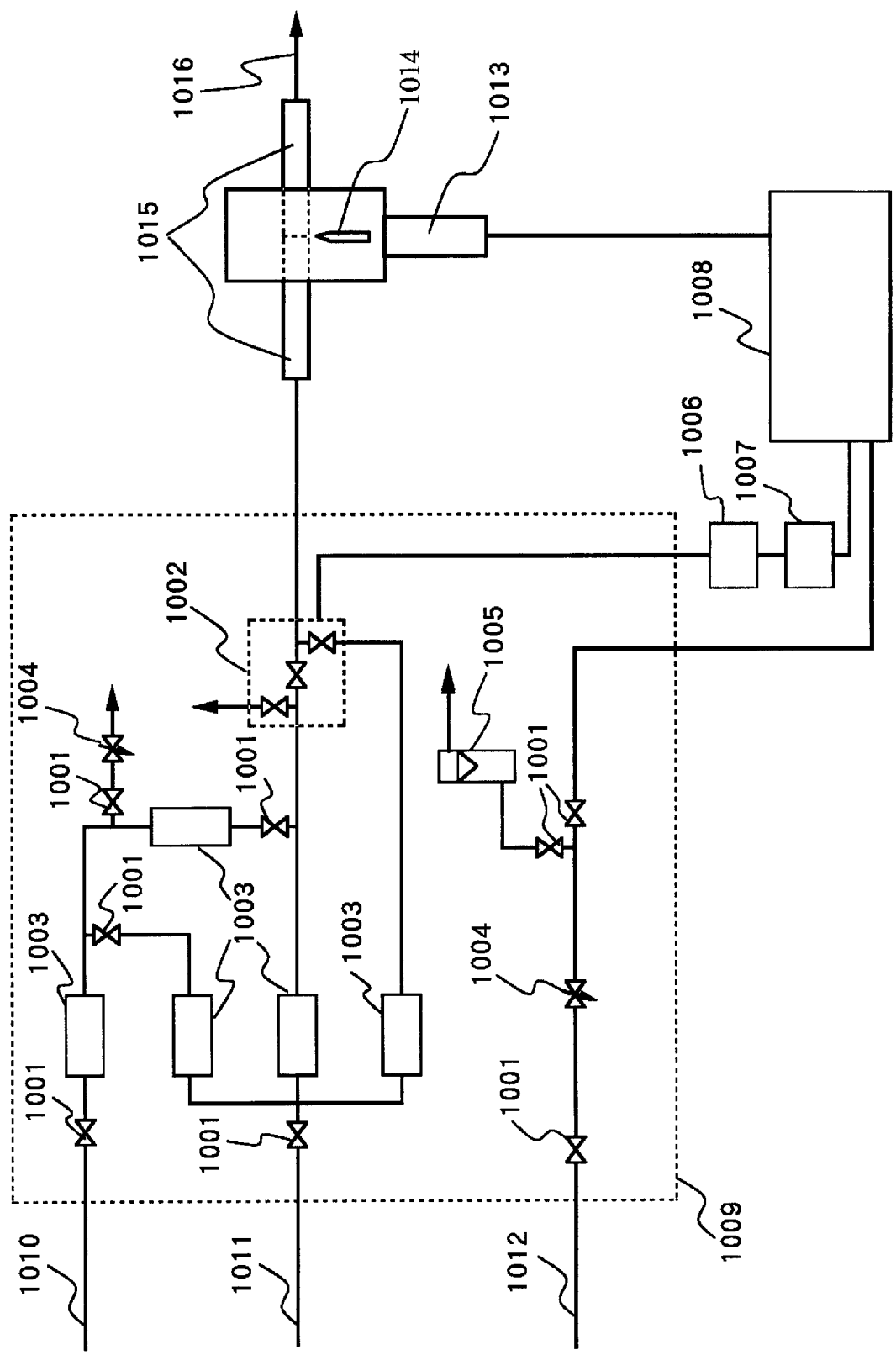
FIG. 10 is a schematic view of a gas supplying system according to the invention, in which supply of gases used at the time of welding and at a chromium oxide passivation treatment have been made possible by a transportable gas supplying system, and switching between the gases used at the time of usual welding and the gases which are doped with a very small quantity of oxidizing gas and a welding power-source are interlocked, in addition, external inputs and data management have been made possible.

FIG. 10 is a schematic view of a transportable gas supplying system in which the welding machine can be interlocked with the switching valve by switching the gas supplying system valve in Embodiment 1 to an automatic valve 1002, connecting a switch 1006 actuating the valve 1002 with a timer 1007, in addition, connecting with the welding electrodes, and in which the whole gas system is integrated in a gas box.

Figure 11:
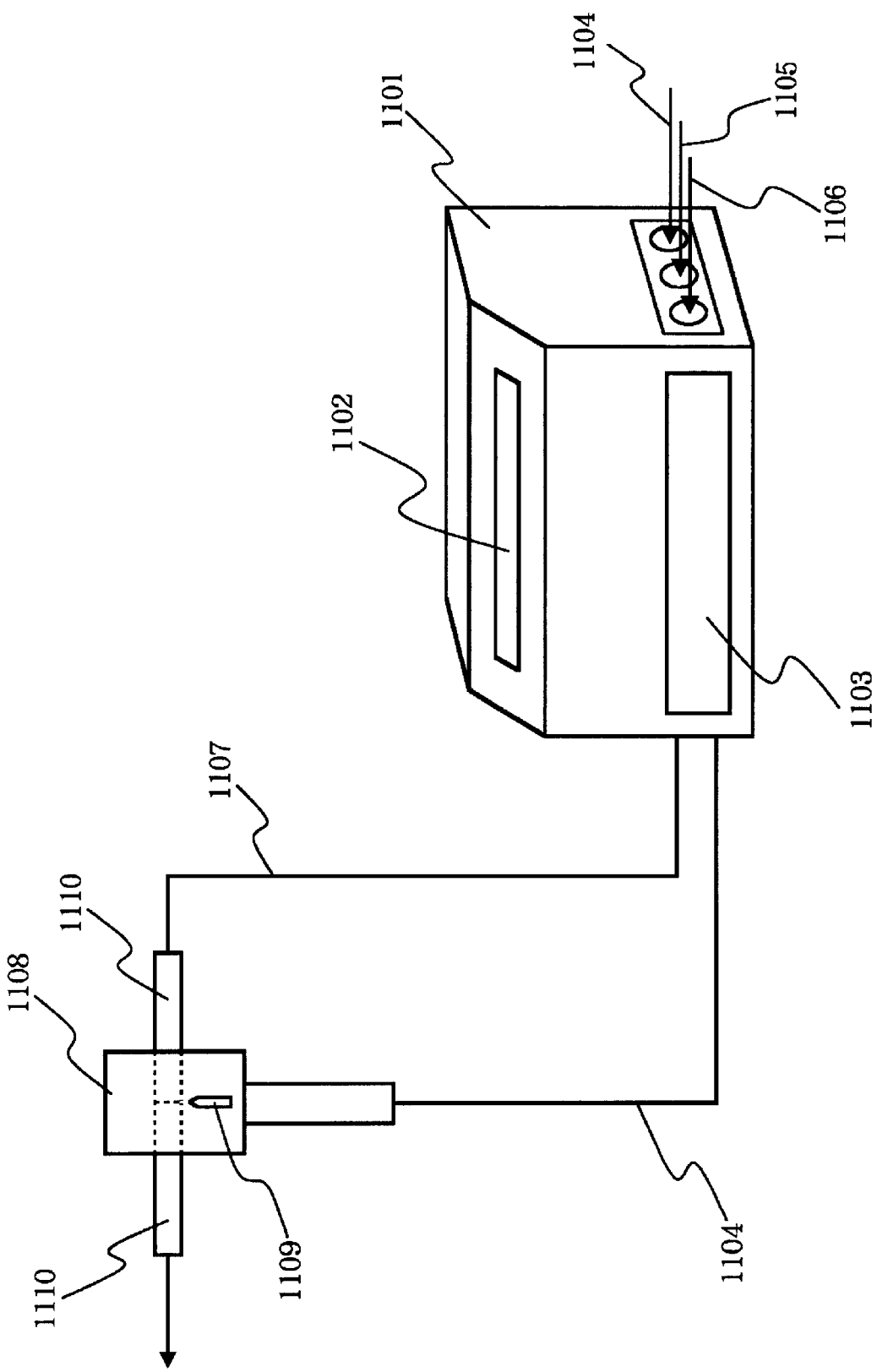
FIG. 11 is a view showing a specified constitution example of the system shown in FIG. 10.
Figure 12:
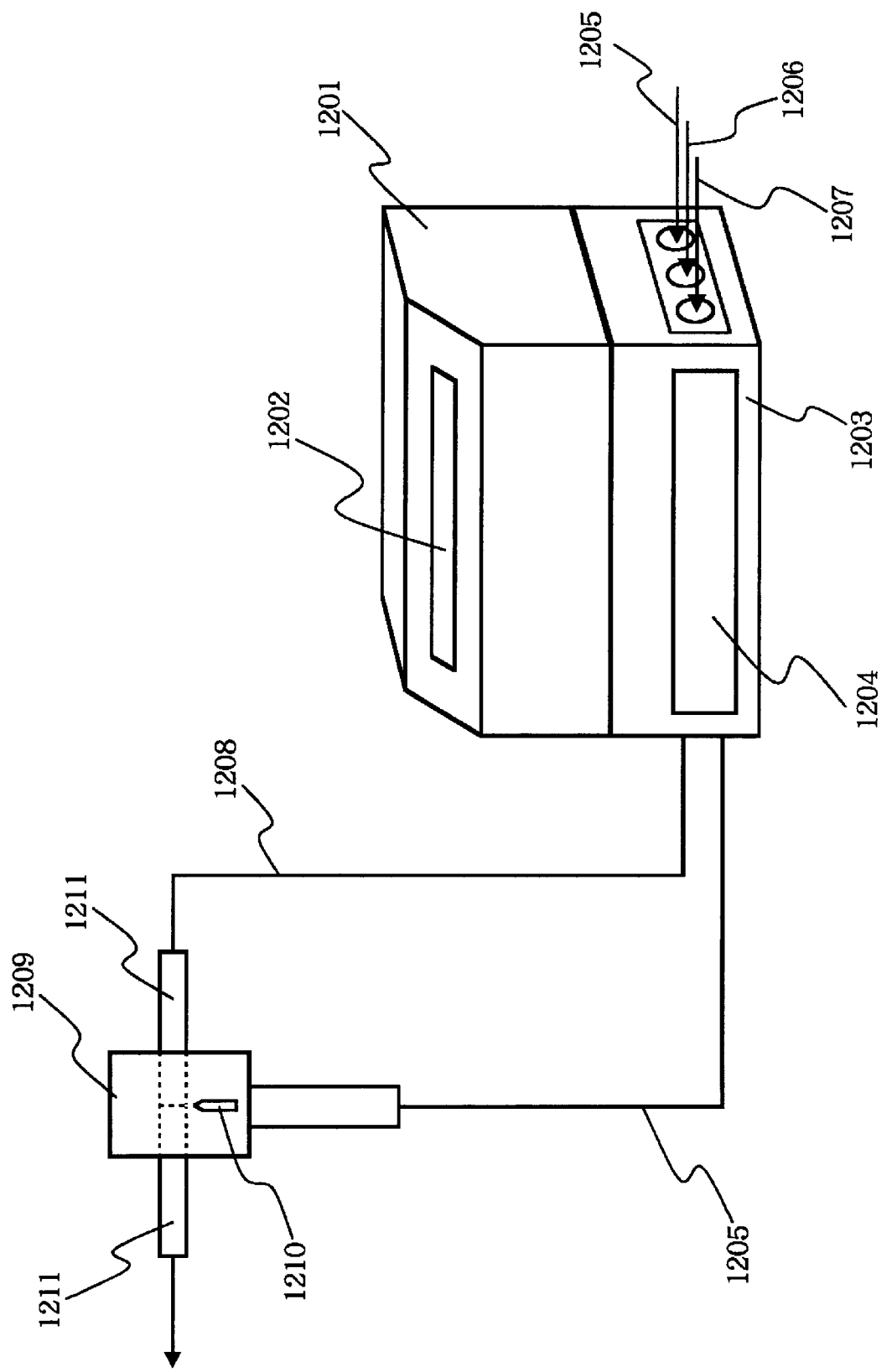
FIG. 12 is a view showing other specified constitution example of the system shown in FIG. 10.

Its specified configuration example is shown in FIG. 11 and FIG. 12. The example shown in FIG. 11 is what the gas-applying system is integrated with the welding power-source to accommodate it in a housing, and the example shown in FIG. 12 is what a gas-applying system 1203 and a and a welding electrodes 1201 are accommodated into individual housings respectively to place the welding electrodes 1201 on the gas-applying system 1203.

Therefore, the gas-applying system and the welding electrodes are controlled by the electrical signal at the time of giving the chromium oxide passivation treatment in concurrence with welding, whereby computer control and a computer-controlled data management become possible, so that the artificial improper operation can not only be prevented, but also productivity such as the management of the welding conditions at the time of welding also can be improved.

Moreover, the gas-applying system is transportable, whereby handling at the time giving of welding becomes easy.

Applicability in the Industry

According to the invention, the chromium oxide passivation treatment can be given in concurrence with welding, whereby treatment in a short time can be realized and to be led to improvement in productivity.

According to the invention, a gas supplying system capable of supplying oxygen or moisture, and hydrogen correctly controlled for forming an oxidized passivity film at the weld can be provided.

According to the invention, the problems of improper operation or the like due to manually switching in applying gas can be not only solved, but also handling at the time giving of welding becomes significantly easy by providing the transportable gas supplying system.

According to the invention, the chromium oxide passivation treatment can be given in all the portion contacting with the gases including also the weld, whereby the fluid supplying system with the excellent drought characteristic, corrosion resistance and non-catalytic action can be provided.

What is claimed is:

1. A method for forming a chromium passivation film on a welded portion, comprising the steps of:
   providing a component having an inner surface, said inner surface defining a cavity within said component;
   welding a portion of said inner surface to thereby form a welded portion of said inner surface, said step of welding being performed while flowing a first gas into said cavity and into contact with said inner surface, said first gas being one of argon gas and a mixed gas of argon and hydrogen;
   switching a flow of gas into said cavity, said flow of gas being switched from said first gas to a second gas of argon doped with an oxidizing gas; and
   irradiating said welded portion of said inner surface with one of an arc and an electron beam to such an extent that said welded portion does not melt, said step of irradiating being performed while flowing second gas into said cavity, a chromium oxide passivation film thereby being formed on a surface of said welded portion of said inner surface of said component.

2. The method according to claim 1, wherein said oxidizing gas is an oxygen gas and its concentration is within the range of 1 ppm to 1000 ppm.

3. The method according to claim 2, wherein said oxidizing gas is an oxygen gas and its concentration is within the range of 10 ppm to 100 ppm.

4. The method according to claim 3, wherein said oxidizing gas is an oxygen gas and its concentration is within the range of 20 ppm to 50 ppm.

5. The method according to claim 1, wherein said oxidizing gas is moisture and its concentration is within the range of 1 ppm to 1000 ppm.

6. The method according to claim 5, wherein said oxidizing gas is moisture and its concentration is within the range of 10 ppm to 100 ppm.

7. The method according to claim 6, wherein said oxidizing gas is moisture and its concentration is within the range of 20 ppm to 50 ppm.

8. The method according to claim 1, wherein hydrogen of greater than 0% to 10% replaces the oxidizing gas.

9. The method according to claim 1, wherein for welding conditions for forming the chromium oxide passivation film, a rotation speed of material to be welded relative to the welding electrodes is set at 2 rpm to 15 rpm.

10. The method according to claim 9, wherein said rotation speed is 6 rpm to 8 rpm.

11. The method according to claim 1, wherein for welding conditions for forming the chromium oxide passivation film, a welding current is set at 3 A to 10 A.

12. The method according to claim 11, wherein the welding current is set at 6 A to 8 A.

13. The method according to claim 1, wherein for welding conditions for forming the chromium oxide passivation film, the welding electrodes is rotated between one round to four rounds.

14. The method according to claim 1, wherein said component is a welding piping and further wherein, after welding and prior to switching of said gases, the temperature of the welding piping is set uniformly and the welding electrodes or the material to be welded are rotated one round or more in order to replace the gas used at the time of usual welding with the gas used at the time of forming the chromium oxide passivation film.

15. The method according to claim 1, wherein ferrite system stainless steel containing chromium of 25% or more is used as the material to be welded.

16. The method according to claim 1, wherein said argon gas doped with said oxidizing gas has been mixed in advance to be accommodated in a bomb and is thereby supplied from said bomb.

* * * * *